(12) United States Patent
Taherzadeh Boroujeni et al.

(10) Patent No.: US 11,695,501 B2
(45) Date of Patent: Jul. 4, 2023

(54) ADAPTIVE CONTROL CHANNEL BLIND DETECTION LIMITS

(71) Applicant: QUALCOMM Incorporated, San Diego, CA (US)

(72) Inventors: Mahmoud Taherzadeh Boroujeni, San Diego, CA (US); Tao Luo, San Diego, CA (US); Jelena Damnjanovic, Del Mar, CA (US); Junyi Li, Fairless Hills, PA (US); Xiaoxia Zhang, San Diego, CA (US); Iyab Issam Sakhnini, San Diego, CA (US); Wooseok Nam, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 103 days.

(21) Appl. No.: 17/365,525

(22) Filed: Jul. 1, 2021

(65) Prior Publication Data

US 2022/0014307 A1 Jan. 13, 2022

Related U.S. Application Data

(60) Provisional application No. 63/050,700, filed on Jul. 10, 2020.

(51) Int. Cl.
*H04L 1/00* (2006.01)
*H04W 72/04* (2023.01)
*H04W 24/08* (2009.01)
*H04W 72/23* (2023.01)
*H04W 72/0453* (2023.01)

(52) U.S. Cl.
CPC ........... *H04L 1/0038* (2013.01); *H04W 24/08* (2013.01); *H04W 72/0453* (2013.01); *H04W 72/23* (2023.01)

(58) Field of Classification Search
CPC .. H04L 1/0038; H04W 24/08; H04W 72/042; H04W 72/0453
See application file for complete search history.

(56) References Cited

U.S. PATENT DOCUMENTS

2020/0154413 A1  5/2020  Hosseini et al.
2021/0351865 A1* 11/2021  Ouchi ..................... H04W 8/24

FOREIGN PATENT DOCUMENTS

WO   2021016046 A1   1/2021
WO   2021138627 A1   7/2021

OTHER PUBLICATIONS

International Search Report and Written Opinion—PCT/US2021/040241—ISA/EPO—Oct. 21, 2021.

(Continued)

*Primary Examiner* — Ronald B Abelson
(74) *Attorney, Agent, or Firm* — Patterson + Sheridan, LLP

(57) ABSTRACT

Certain aspects of the present disclosure provide techniques for blind decoding and channel estimation (BD/CE) limitations and configuration of new radio (NR) physical downlink control channel (PDCCH) repetition. A method that may be performed by a user equipment (UE) includes receiving, from a base station, an indication of at least one blind detection limit for detecting a control channel from a set of blind detection limits and monitoring for the control channel based on the received indication of the at least one blind detection limit for detecting the control channel.

30 Claims, 9 Drawing Sheets

(56) References Cited

OTHER PUBLICATIONS

Mediatek Inc: "Discussion on Reduced PDCCH Monitoring for NR RedCap UEs", 3GPP TSG RAN WG1 Meeting #101-e, 3GPP Draft, R1-2003688, 3rd Generation Partnership Project (3GPP), Mobile Competence Centre, 650, Route Des Lucioles, F-06921 Sophia-Antipolis Cedex, France, vol. RAN WG1, No. e-Meeting, May 25, 2020-Jun. 5, 2020, May 16, 2020 (May 16, 2020), XP051885463.

* cited by examiner

ADAPTIVE CONTROL CHANNEL BLIND DETECTION LIMITS

CROSS-REFERENCE TO RELATED APPLICATIONS

This application claims benefit of and priority to U.S. Provisional Application No. 63/050,700, filed Jul. 10, 2020, which is hereby assigned to the assignee hereof and hereby expressly incorporated by reference herein in its entirety as if fully set forth below and for all applicable purposes.

INTRODUCTION

Field of the Disclosure

Aspects of the present disclosure relate to wireless communications, and more particularly, to techniques for communicating using adaptive control channel blind detection limits in a wireless communication network.

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include communicating using adaptive control channel blind detection limits.

Certain aspects of the subject matter described in this disclosure can be implemented in a method for wireless communication in a wireless network by a user equipment (UE). The method generally includes receiving, from a base station, an indication of at least one blind detection limit for detecting a control channel from a set of blind detection limits and monitoring for the control channel based on the received indication of the at least one blind detection limit for detecting the control channel.

Certain aspects of the subject matter described in this disclosure can be implemented in an apparatus for wireless communication in a wireless network by a user equipment (UE). The apparatus generally includes a memory comprising executable instructions; and one or more processors configured to execute the executable instructions and cause the apparatus to: receive, from a base station, an indication of at least one blind detection limit for detecting a control channel from a set of blind detection limits and monitor for the control channel based on the received indication of the at least one blind detection limit for detecting the control channel. The apparatus also generally includes a memory coupled with the at least one processor.

Certain aspects of the subject matter described in this disclosure can be implemented in an apparatus for wireless communication in a wireless network by a user equipment (UE). The apparatus generally includes means for receiving, from a base station, an indication of at least one blind detection limit for detecting a control channel from a set of blind detection limits and means for monitoring for the control channel based on the received indication of the at least one blind detection limit for detecting the control channel.

Certain aspects of the subject matter described in this disclosure can be implemented in a non-transitory computer-readable medium for wireless communication in a wireless network by a user equipment (UE). The non-transitory computer-readable medium generally includes executable instructions that, when executed by one or more processors of an apparatus, cause the apparatus to: receive, from a base station, an indication of at least one blind detection limit for detecting a control channel from a set of blind detection limits and monitor for the control channel based on the received indication of the at least one blind detection limit for detecting the control channel.

Certain aspects of the subject matter described in this disclosure can be implemented in a computer program product for wireless communication in a wireless network by a user equipment (UE). The computer program product may be embodied on a computer-readable storage medium comprising code for receiving, from a base station, an indication of at least one blind detection limit for detecting a control channel from a set of blind detection limits and monitoring for the control channel based on the received indication of the at least one blind detection limit for detecting the control channel.

Certain aspects of the subject matter described in this disclosure can be implemented in a method for wireless communication in a wireless network by a base station (BS). The method generally includes determining at least one blind detection limit for detecting a control channel from a set of blind detection limits and transmitting an indication of the at least one blind detection limit to a user equipment (UE).

Certain aspects of the subject matter described in this disclosure can be implemented in an apparatus for wireless communication in a wireless network by a base station (BS). The apparatus generally includes a memory comprising executable instructions; and one or more processors configured to execute the executable instructions and cause the apparatus to: determine at least one blind detection limit for detecting a control channel from a set of blind detection limits and transmit an indication of the at least one blind detection limit to a user equipment (UE). The apparatus also generally includes a memory coupled with the at least one processor.

Certain aspects of the subject matter described in this disclosure can be implemented in an apparatus for wireless communication in a wireless network by a base station (BS). The apparatus generally includes means for determining at least one blind detection limit for detecting a control channel from a set of blind detection limits and means for transmitting an indication of the at least one blind detection limit to a user equipment (UE).

Certain aspects of the subject matter described in this disclosure can be implemented in a non-transitory computer-readable medium for wireless communication in a wireless network by a base station (BS). The non-transitory computer-readable medium generally includes executable instructions that, when executed by one or more processors of an apparatus, cause the apparatus to: determine at least one blind detection limit for detecting a control channel from a set of blind detection limits and transmit an indication of the at least one blind detection limit to a user equipment (UE).

Certain aspects of the subject matter described in this disclosure can be implemented in a computer program product for wireless communication in a wireless network by a base station (BS). The computer program product may be embodied on a computer-readable storage medium comprising code for determining at least one blind detection limit for detecting a control channel from a set of blind detection limits and transmitting an indication of the at least one blind detection limit to a user equipment (UE).

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
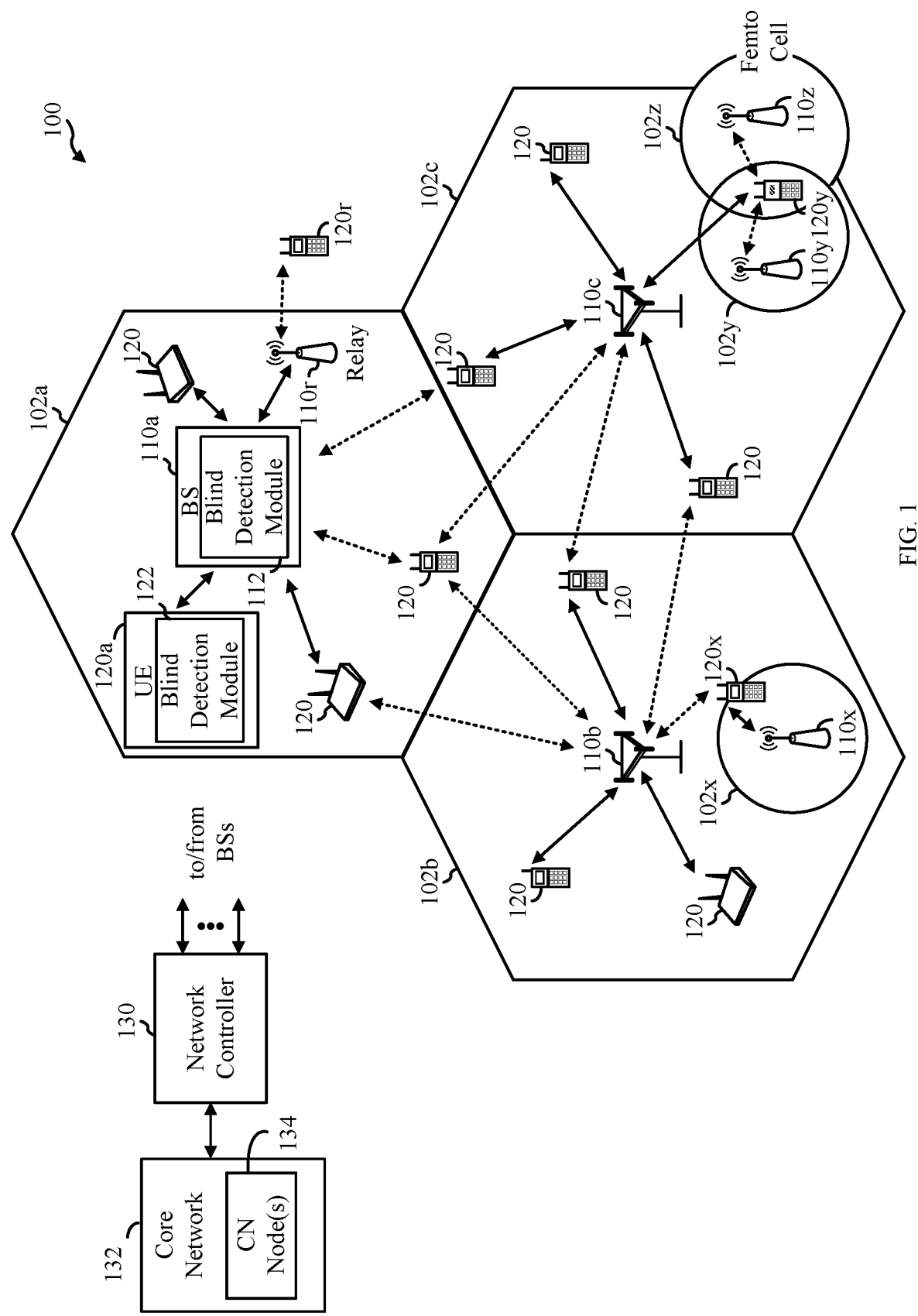
FIG. 1 is a block diagram conceptually illustrating an example telecommunications system, in accordance with certain aspects of the present disclosure.

Aspects of the present disclosure provide apparatus, methods, processing systems, and computer readable mediums for communicating using adaptive control channel blind detection limits.

In some cases, the UE may perform blind decoding (BD) and channel estimation (CE) within a particular search space to monitor for and receive a physical downlink control channel (PDCCH). In some cases, limitations, known as blind detection limits, may be placed on at least one of a number of blind decodes or a number of channel estimations that a UE may perform within a slot. The blind detection limits may be statically configured and specify the number of blind decodes and/or the number of channel estimations that the UE should perform within the slot to monitor for and receive the PDCCH.

In some cases, a capability of a UE to perform PDCCH monitoring (e.g., in terms of managing the complexity of monitoring) may change over time due to the changing of power consumption at the UE, available power at the UE, or the processing power needed for other performing other procedures (e.g., including content processing) within the UE. For example, while the UE may be able to handle higher complexity PDCCH monitoring for short periods of time, the overall average complexity may need to be lower for longer time periods for the sake of limiting power consumption at the UE. Accordingly, in certain cases, such as when the UE is power limited, the UE may want to reduce the amount of processing power used for PDCCH detection, thereby conserving power resources at the UE. However, because the blind detection limits are statically configured, the UE may be prevented UE from reducing PDCCH monitoring complexity (e.g., reducing the number of blind decodes and/or channel estimates), even in situations where the UE is power limited.

Thus, aspects of the present disclosure provide techniques for adaptively configuring blind detections limits to provide flexibility for handling situations in which lower control channel monitoring complexity is desirable at the UE, for example, to save power.

The following description provides examples of communicating using adaptive control channel blind detection limits in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for NR PDCCH repetition. As shown in FIG. 1, the BS 110a includes a blind detection module 112. The blind detection module 112 may be configured to perform the operations illustrated in one or more of FIG. 6, as well as other operations disclosed herein for communicating using adaptive control channel blind detection limits, in accordance with aspects of the present disclosure. Additionally, as shown in FIG. 1, the UE 120a includes a blind detection module 122. The blind detection module 122 may be configured to perform the operations illustrated in one or more of FIG. 7, as well as other operations disclosed herein for communicating using adaptive control channel blind detection limits, in accordance with aspects of the present disclosure.

Figure 2:
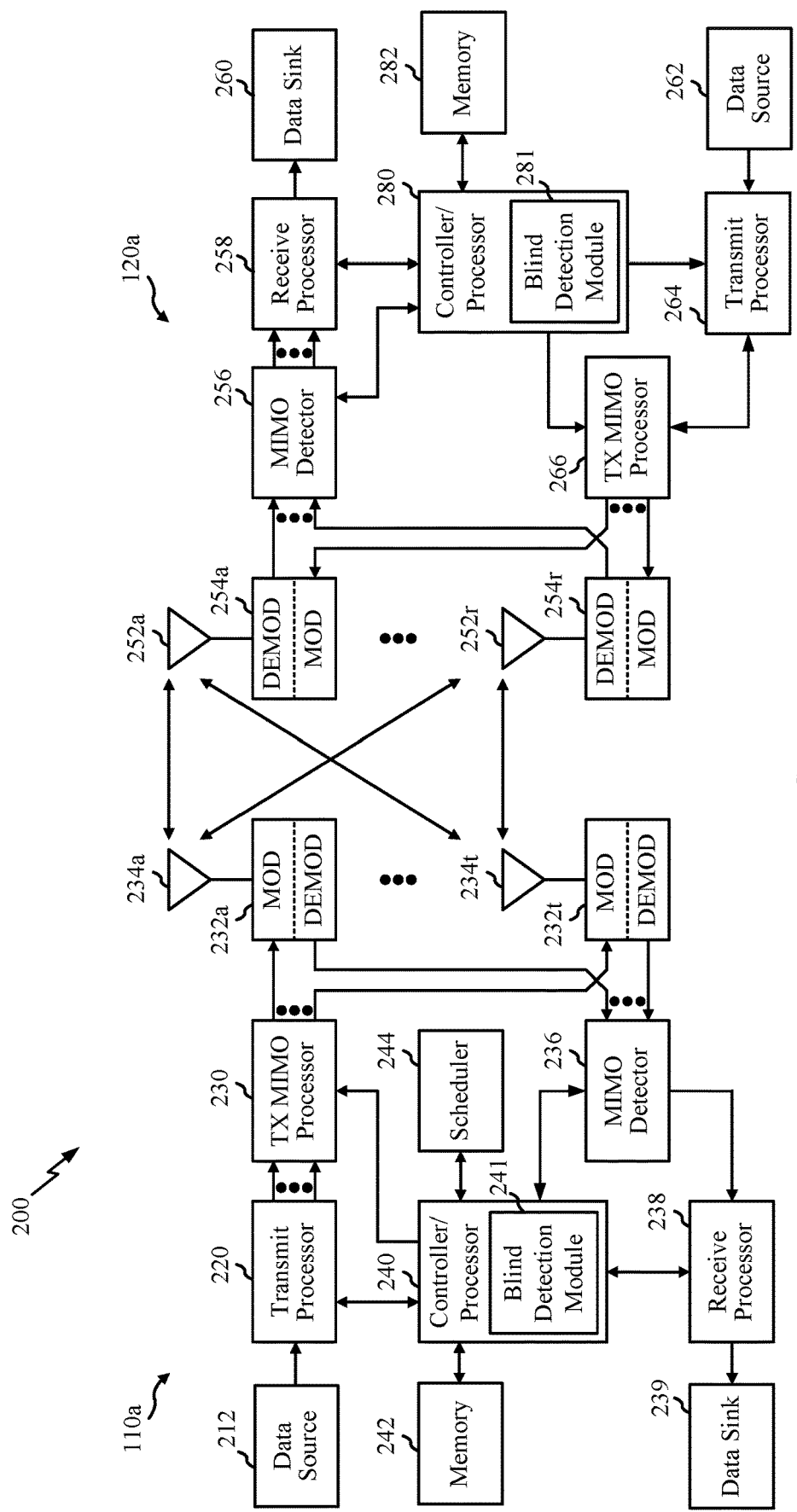
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein for NR PDCCH repetition. For example, as shown in FIG. 2, the controller/processor 240 of the BS 110a includes a blind detection module 241 that may be configured to perform the operations illustrated in one or more of FIG. 6, as well as other operations disclosed herein for communicating using adaptive control channel blind detection limits, in accordance with aspects of the present disclosure. As shown in FIG. 2, the controller/processor 280 of the UE 120a includes blind detection module 281 that may be configured to perform the operations illustrated in one or more of FIG. 7, as well as other operations disclosed herein for communicating using adaptive control channel blind detection limits, in accordance with aspects of the present disclosure. Although shown at the Controller/Processor, other components of the UE 120a and BS 110a may be used performing the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
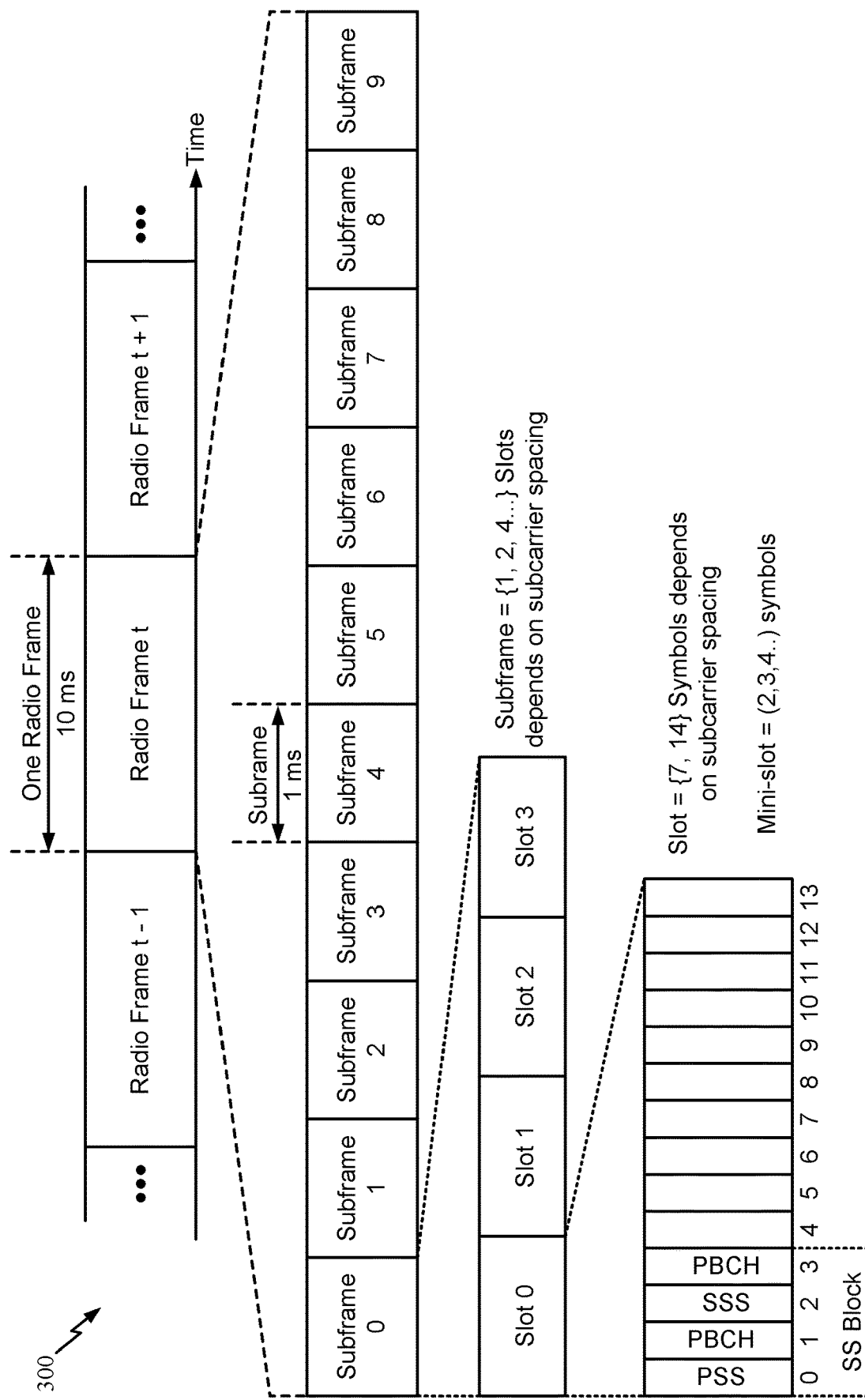
FIG. 3 is an example frame format for new radio (NR), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block (SSB) is transmitted. The SS block includes a PSS, a SSS, and a two symbol PBCH. The SS block can be transmitted in a fixed slot location, such as the symbols 0-3 as shown in FIG. 3.

The PSS and SSS may be used by UEs for cell search and acquisition. The PSS may provide half-frame timing, and the SS may provide the CP length and frame timing. The PSS and SSS may provide the cell identity. The PBCH carries some basic system information, such as downlink system bandwidth, timing information within radio frame, SS burst set periodicity, system frame number, etc.

Further system information such as, remaining minimum system information (RMSI), system information blocks (SIBs), other system information (OSI) can be transmitted on a physical downlink shared channel (PDSCH) in certain subframes.

Figure 4:
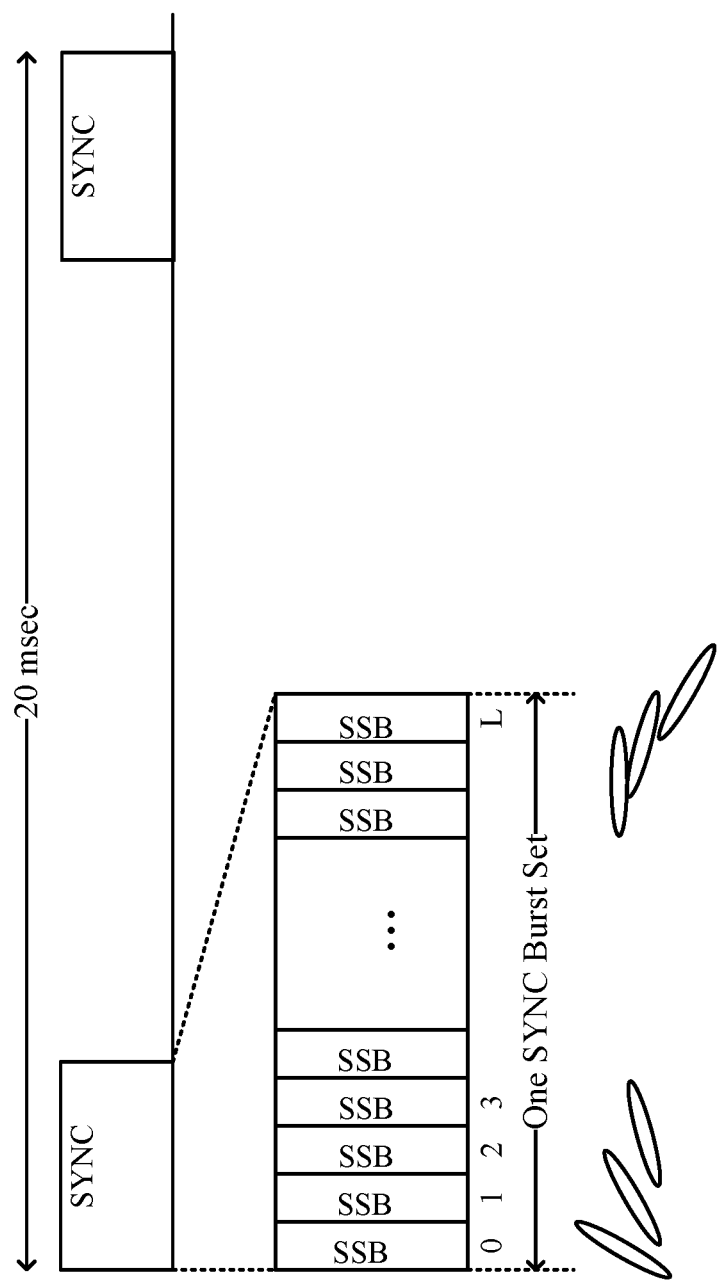
FIG. 4 illustrates how different synchronization signal blocks (SSBs) may be sent using different beams, in accordance with certain aspects of the present disclosure.

As shown in FIG. 4, the SS blocks may be organized into SS burst sets to support beam sweeping. As shown, each SSB within a burst set may be transmitted using a different beam, which may help a UE quickly acquire both transmit (Tx) and receive (Rx) beams (particular for mmW applications). A physical cell identity (PCI) may still decoded from the PSS and SSS of the SSB.

Certain deployment scenarios may include one or both NR deployment options. Some may be configured for non-standalone (NSA) and/or standalone (SA) option. A standalone cell may need to broadcast both SSB and remaining minimum system information (RMSI), for example, with SIB1 and SIB2. A non-standalone cell may only need to broadcast SSB, without broadcasting RMSI. In a single carrier in NR, multiple SSBs may be sent in different frequencies, and may include the different types of SSB.

Control Resource Sets (CORESETs)

A control resource set (CORESET) for an OFDMA system (e.g., a communications system transmitting PDCCH using OFDMA waveforms) may comprise one or more control resource (e.g., time and frequency resources) sets, configured for conveying PDCCH, within the system bandwidth (e.g., a specific area on the NR Downlink Resource Grid) and a set of parameters used to carry PDCCH/DCI. For example, a CORESET may by similar in area to an LTE PDCCH area (e.g., the first 1,2,3,4 OFDM symbols in a subframe).

Within each CORESET, one or more search spaces (e.g., common search space (CSS), user equipment (UE)-specific search space (USS), etc.) may be defined for a given UE. Search spaces are generally areas or portions in a downlink resource grid where a communication device (e.g., a UE) may look for control information.

According to aspects of the present disclosure, a CORESET is a set of time and frequency domain resources, defined in units of resource element groups (REGs). Each REG may comprise a fixed number (e.g., twelve) tones/subcarriers in one symbol period (e.g., a symbol period of a slot), where one tone in one symbol period is referred to as a resource element (RE). A fixed number of REGs, such as six, may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE. The UE may receive the NR-PDCCH by searching in search spaces for the UE and decoding the NR-PDCCH transmitted by the NodeB.

As noted above, different aggregation levels may be used to transmit sets of CCEs. Aggregation levels may be generally defined as the number of CCEs that consist of a PDCCH candidate and may include aggregation levels 1, 2, 4, 8, and 18, which may be configured by a radio resource control (RRC) configuration of a search space set (SS-set). A CORESET may be linked with the SS-set within the RRC configuration. For each aggregation level, the number of PDCCH candidates may be RRC configurable.

Operating characteristics of a NodeB or other base station in an NR communications system may be dependent on a frequency range (FR) in which the system operates. A frequency range may comprise one or more operating bands (e.g., "n1" band, "n2" band, "n7" band, and "n41" band), and a communications system (e.g., one or more NodeBs and UEs) may operate in one or more operating bands. Frequency ranges and operating bands are described in more detail in "Base Station (BS) radio transmission and reception" TS38.104 (Release 15), which is available from the 3GPP website.

As described above, a CORESET is a set of time and frequency domain resources. The CORESET can be configured for conveying PDCCH within system bandwidth. A UE may determine a CORESET and monitors the CORESET for control channels. During initial access, a UE may identify an initial CORESET (CORESET #0) configuration from a field (e.g., pdcchConfigSIB1) in a maser information block (MIB). This initial CORESET may then be used to configure the UE (e.g., with other CORESETs and/or bandwidth parts via dedicated (UE-specific) signaling. When the UE detects a control channel in the CORESET, the UE attempts to decode the control channel and communicates with the transmitting BS (e.g., the transmitting cell) according to the control data provided in the control channel (e.g., transmitted via the CORESET).

In some cases, CORESET #0 may include different numbers of resource blocks (RBs). For example, in some cases, CORESET #0 may include one of 24, 48, or 96 RBs. For other CORESETSs, a 45-bit bitmap may be used to configure available RB-groups, where each bit in the bitmap is with respect to 6-RBs within a bandwidth part (BWP) and a most significant bit corresponds to the first RB-group in the BWP.

According to aspects of the present disclosure, when a UE is connected to a cell (or BS), the UE may receive a master information block (MIB). The MIB can be in a synchronization signal and physical broadcast channel (SS/PBCH) block (e.g., in the PBCH of the SS/PBCH block) on a synchronization raster (sync raster). In some scenarios, the sync raster may correspond to an SSB. From the frequency of the sync raster, the UE may determine an operating band of the cell. Based on a cell's operation band, the UE may determine a minimum channel bandwidth and a subcarrier spacing (SCS) of the channel. The UE may then determine an index from the MIB (e.g., four bits in the MIB, conveying an index in a range 0-15).

Given this index, the UE may look up or locate a CORESET configuration (this initial CORESET configured via the MIB is generally referred to as CORESET #0). This may be accomplished from one or more tables of CORESET configurations. These configurations (including single table scenarios) may include various subsets of indices indicating valid CORESET configurations for various combinations of minimum channel bandwidth and subcarrier spacing (SCS). In some arrangements, each combination of minimum channel bandwidth and SCS may be mapped to a subset of indices in the table.

Alternatively or additionally, the UE may select a search space CORESET configuration table from several tables of CORESET configurations. These configurations can be based on a minimum channel bandwidth and SCS. The UE may then look up a CORESET configuration (e.g., a Type0-PDCCH search space CORESET configuration) from the selected table, based on the index. After determining the CORESET configuration (e.g., from the single table or the selected table), the UE may then determine the CORESET to be monitored (as mentioned above) based on the location (in time and frequency) of the SS/PBCH block and the CORESET configuration.

Figure 5:
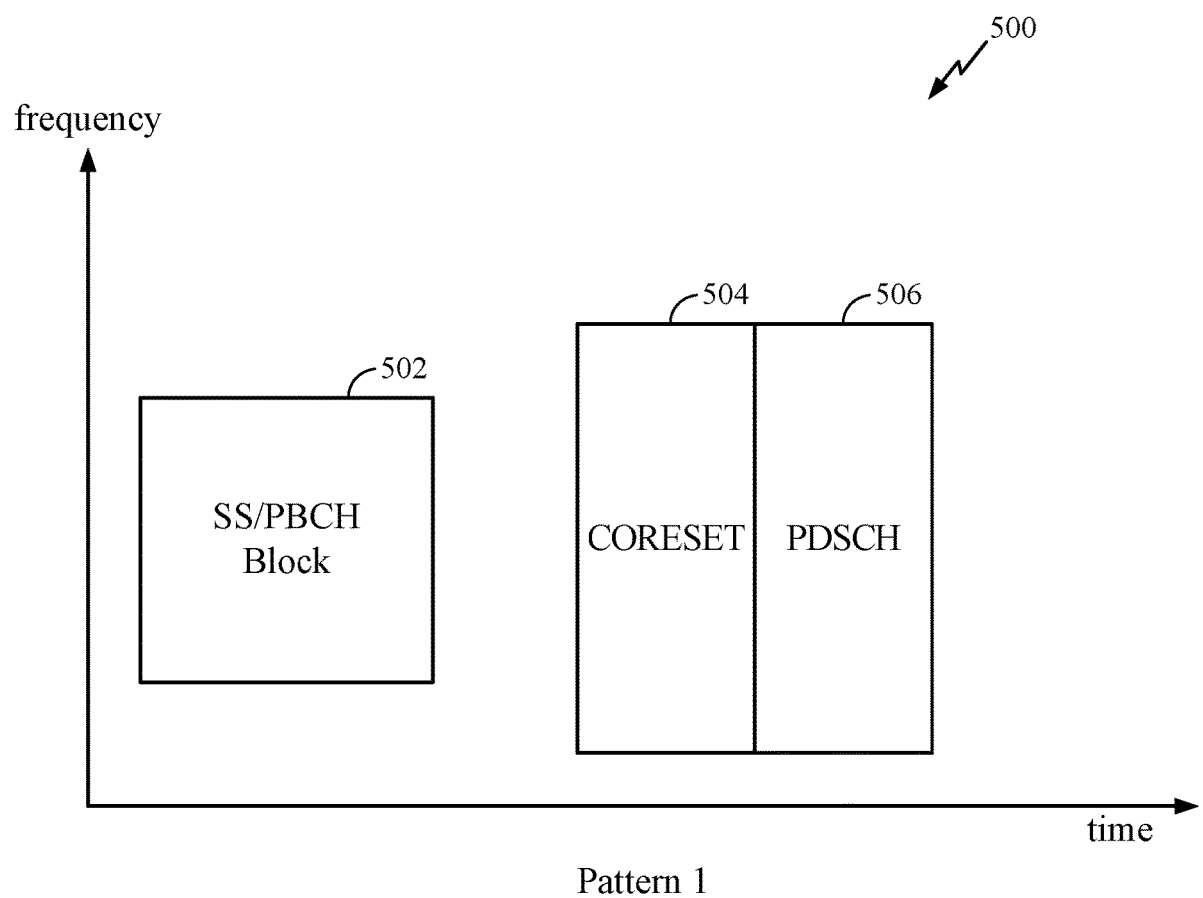
FIG. 5 shows an exemplary transmission resource mapping, according to aspects of the present disclosure.

FIG. 5 shows an exemplary transmission resource mapping 500, according to aspects of the present disclosure. In the exemplary mapping, a BS (e.g., BS 110a, shown in FIG. 1) transmits an SS/PBCH block 502. The SS/PBCH block includes a MIB conveying an index to a table that relates the time and frequency resources of the CORESET 504 to the time and frequency resources of the SS/PBCH block.

The BS may also transmit control signaling. In some scenarios, the BS may also transmit a PDCCH to a UE (e.g., UE 120, shown in FIG. 1) in the (time/frequency resources of the) CORESET. The PDCCH may schedule a PDSCH 506. The BS then transmits the PDSCH to the UE. The UE may receive the MIB in the SS/PBCH block, determine the index, look up a CORESET configuration based on the index, and determine the CORESET from the CORESET configuration and the SS/PBCH block. The UE may then monitor the CORESET, decode the PDCCH in the CORESET, and receive the PDSCH that was allocated by the PDCCH.

Different CORESET configurations may have different parameters that define a corresponding CORESET. For example, each configuration may indicate a number of resource blocks (e.g., 24, 48, or 96), a number of symbols (e.g., 1-3), as well as an offset (e.g., 0-38 RBs) that indicates a location in frequency.

Example Adaptive Control Channel Blind Detection Limits

As noted above, physical downlink control channel (PDCCH) information may be carried in one or more CORESETs, spanning the first 1, 2, 3, or 4 OFDM symbols of a subframe/slot. Within each CORESET, one or more search spaces (e.g., common search space (CSS), UE-specific search space (USS), etc.) may be defined for a particular UE where each search space may be associated with one CORESET. Search spaces are generally areas or portions of a downlink resource grid where a communication device, such as a UE, may monitor for control information.

In some cases, the UE may perform blind decoding (BD) and channel estimation (CE) within a particular search space to detect and receive a PDCCH. In some cases, limitations may be placed on at least one of a number of blind decodes or a number of channel estimations that a UE may perform within a slot to try to detect and receive the PDCCH. These limitations may be known as blind detection limits. Table 1, below, illustrates the maximum number of blind decodes a UE may perform in a slot for different numerologies ($\mu$), where $\mu$ refers to a subcarrier spacing (e.g., 15 kHz, 30 kHz, 60 kHz, 120 kHz, etc.).

TABLE 1

Maximum Blind Decodes

| Numerology | Max # of BD in Slot |
|---|---|
| $\mu = 0$ | 44 |
| $\mu = 1$ | 36 |
| $\mu = 2$ | 22 |
| $\mu = 3$ | 20 |

Table 2, below, illustrates the maximum number of control channel elements (CCE) that require channel estimation (e.g., based on a capability of the UE) in a slot for different numerologies ($\mu$). As noted above, $\mu$ refers to a subcarrier spacing (e.g., 15 kHz, 30 kHz, 60 kHz, 120 kHz, etc.).

| Numerology | Max # of CCEs in Slot |
|---|---|
| $\mu = 0$ | 56 |
| $\mu = 1$ | 56 |
| $\mu = 2$ | 48 |
| $\mu = 3$ | 32 |

In some cases, periodicities of different search spaces may be different and the position of PDCCH candidates (and CCEs that are covered by them) may also change from slot to slot due to a hashing function used to configure the different search spaces and PDCCH candidate positions, which is a function of a slot number. Thus, enforcing the blind detections limits when configuring the search space for a worst case scenario may not be feasible or efficient for the gNB.

Accordingly, in certain cases, a base station (e.g., gNodeB (gNB)) may be permitted to "overbook" a UE in terms of the number of BDs or CEs to perform (e.g., go over the maximum allowable BD/CE in a slot) with respect to the capability of the UE. In such cases, certain priority rules for different search spaces may be applied to limit the number of BDs and/or CEs that may be performed within a slot, such as, (i) CSS sets are mapped before USS sets, (ii) USS sets are mapped in ascending order of the SS set indices, and (iii) if the number of PDCCH candidates/CCEs exceeds either of the UE blind detection limits, no more SS sets are mapped in the slot after reaching the blind detection limits. As a result of these priority rules, in some cases, search spaces with the last (e.g., largest) index may be dropped, resulting in the UE not performing blind detection in these search spaces. In some cases, there may be no differentiation among candidates inside a search space when dropped.

For higher frequencies and larger subcarrier spacings, corresponding to shorter symbols within a slot, the available time for the processing of a PDCCH becomes shorter (e.g., as compared to lower frequencies and lower subcarrier spacings), putting pressure on these blind detection limits. Additionally, in certain cases, the capability of a UE for PDCCH monitoring (e.g., in terms of managing the complexity of monitoring) may change over time due to the changing of power consumption at the UE, available power at the UE, or the processing power needed for other performing other procedures (e.g., including content processing) within the UE. For example, while the UE may be able to handle higher complexity PDCCH monitoring for short periods of time, the overall average complexity may need to be lower for longer time periods for the sake of limiting power consumption at the UE. Accordingly, in certain cases, such as when the UE is power limited, the UE may want to reduce the amount of processing power used for PDCCH detection, thereby conserving power resources at the UE. However, in certain cases, the blind detection limits for a UE may be static, preventing the UE from reducing PDCCH monitoring complexity, even in situations where the UE is power limited. The UE may be prevented from reducing the PDCC monitoring complexity as there may be a common understanding between UE and base station about what the UE is monitoring for PDCCH blind detection. As such, if the UE reduces its blind detection limits autonomously, the UE may miss a PDCCH transmitted by the base station.

Therefore, aspects of the present disclosure provide techniques for permitting blind detection limits to be adaptively configurable based on signaling from a base station. For example, in some cases, the base station may determine a blind detection limit, from a set of blind detection limits for detecting a control channel. The base station may then transmit an indication of the blind detection limit to a user equipment, configuring the UE to use the blind detection limit to detect and receive the control channel. Allowing the blind detection limits to be adaptively configurable by a base station may provide flexibility to handle situations in which lower control channel monitoring complexity is desirable at the UE, for example, to save power.

Figure 6:
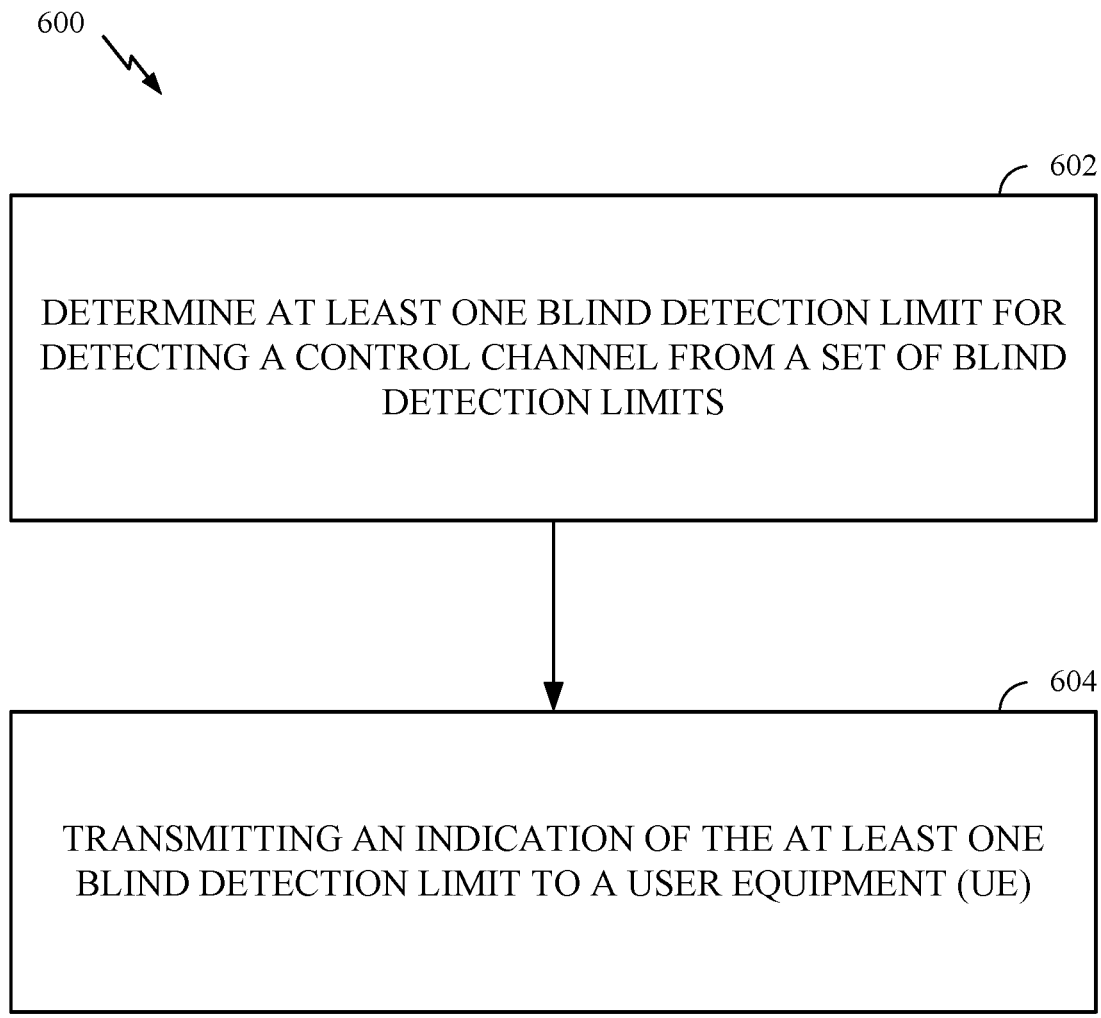
FIG. 6 is a flow diagram illustrating example operations for wireless communication by a BS in a wireless network, according to aspects of the present disclosure.

FIG. 6 is a flow diagram illustrating example operations 600 for wireless communication, in accordance with certain aspects of the present disclosure. The operations 600 may be performed, for example, by a BS (e.g., such as the BS 110a in the wireless communication network 100). Operations 600 may be implemented as software components that are executed and run on one or more processors (e.g., controller/processor 240 of FIG. 2). Further, the transmission and reception of signals by the BS in operations 600 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 600 may begin, at 602, by determining at least one blind detection limit for detecting a control channel from a set of blind detection limits.

At 604, the BS transmits an indication of the at least one blind detection limit to a user equipment (UE).

Figure 7:
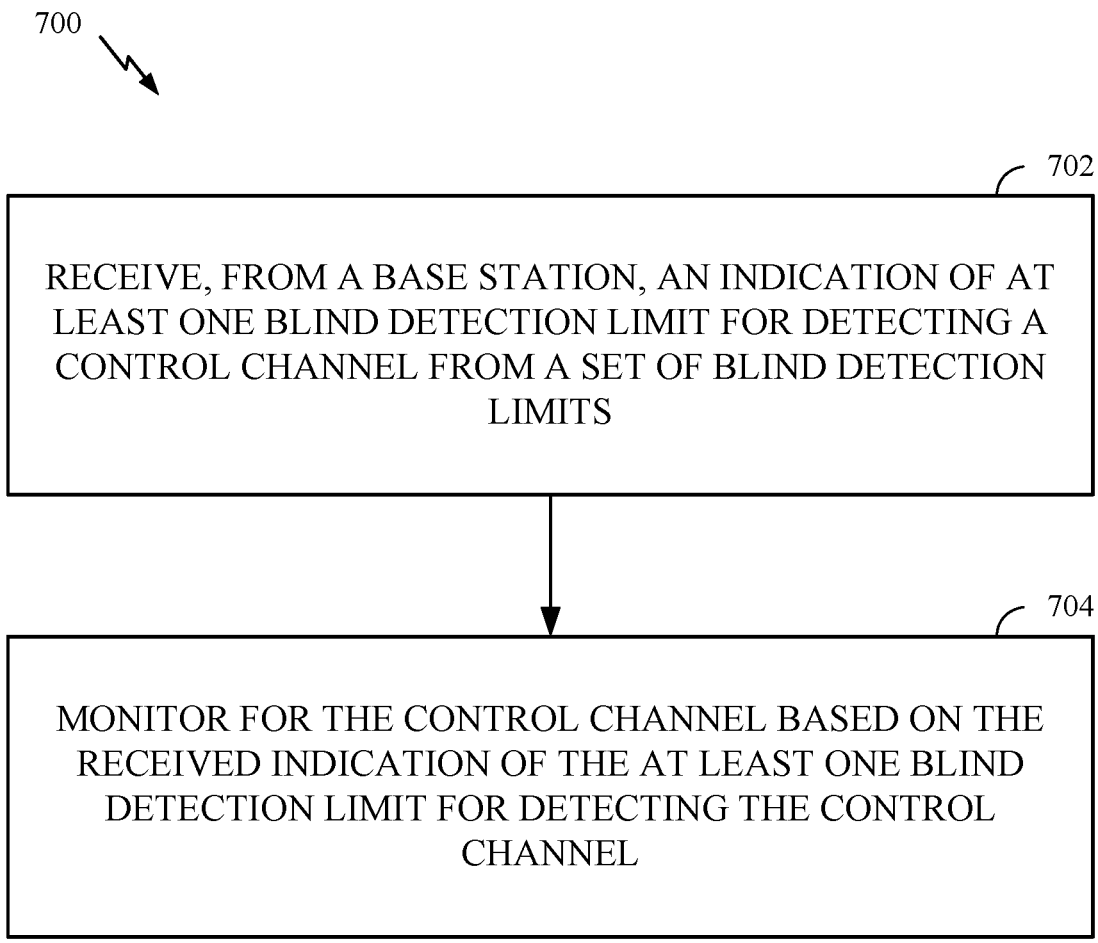
FIG. 7 is a flow diagram illustrating example operations for wireless communication by a UE in a wireless network, according to aspects of the present disclosure.

FIG. 7 is a flow diagram illustrating example operations 700 for wireless communication, in accordance with certain aspects of the present disclosure. The operations 700 may be performed, for example, by UE (e.g., such as a UE 120a in the wireless communication network 100). The operations 700 may be complimentary operations by the UE to the operations 600 performed by the BS. Operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 may begin, at 702, by receiving, from a base station, an indication of at least one blind detection limit for detecting a control channel from a set of blind detection limits.

At 704, the UE monitors for the control channel based on the received indication of the at least one blind detection limit for detecting the control channel.

As noted above, aspects of the present disclosure provide techniques to allow blind detection limits of a UE to be adaptively configured based on signaling received from a base station. For example, the base station may determine at least one blind detection limit for detecting a control channel and may transmit an indication of the at least one blind detection limit to the UE. In some cases, the base station may transmit the indication of the at least one blind detection to the UE dynamically. In other cases, the base station may transmit the indication of the at least one blind detection in semi-persistent scheduling information, scheduling the UE to use the at least one blind detection limit for a period of time.

In some cases, the at least one blind detection limit includes at least one of a limit on a number of blind decodes that may be performed to detect the control channel or a limit on a number of control channel elements corresponding to a decoding candidate of the control channel. In some cases, the control channel may include a PDCCH.

Additionally, in some cases, the at least one blind detection limit may be selected from a set of blind detection limits defined in a standards document. Further, in some cases, the blind detection limits within the set of blind detection limits may each be based on, or depend on, a subcarrier spacing, a frequency range, and/or a capability of the UE.

In some cases, the base station may determine the at least one blind detection limit based on a power level of the UE. For example, the base station may receive an indication of the power level from the UE and select a blind detection limit from the set of blind detection limits that is appropriate for the indicated power level. In some cases, if the power level of the UE is low (e.g., a power level of a batter of the UE is below a threshold), the base station determine the at least one blind detection limit by selecting a blind detection limit from the set of blind detection limits that reduces a monitoring/decoding complexity associated with the control channel. For example, when the power level of the UE is low, the base station may select a blind detection limit that reduces a number of blind decodes the UE needs to perform. Such blind detection limit may also be selected to reduce the number of CCEs that require channel estimation. Accordingly, by reducing the number of blind detections and/or number of CCEs that require channel estimation, power at the UE may be conserved.

In some cases, the BS may also determine the at least one blind detection limit based on at least one of a subcarrier spacing associated with the control channel, a frequency range associated with the control channel, or a capability of the UE.

In some cases, the UE may request to use a particular blind detection limit. For example, the UE may determine that a change in a current blind detection limit is needed, for example, based on one or more parameters, such as a power level of the UE. Accordingly, the UE may transmit signaling requesting to use the at least one blind detection limit, which may be selected by the UE to reduce the number of blind detections or channel estimates to conserve power. In such cases, the base station may receive the signaling and determine the at least one blind detection limit based on the request. In some cases, the signaling may include signaling such as uplink control information (UCI) and/or a media access control (MAC) control element (CE).

In some cases, the signaling including the request may include an explicit indication of the at least one at least one blind detection limit being requested, such as an index value corresponding to the at least one blind detection limit. In some cases, the base station may use the index value to determine the at least one blind detection limit in a lookup table.

In other cases, the signaling including the request may include an implicit indication of the at least one blind detection limit being requested. For example, the signaling may include an indication of a capability of the UE and/or a power level of the UE. Accordingly, based on the indicated capability and/or power level, the base station may infer which blind detection limit of the set of blind detection limits to select/determine.

In some cases, the base station may determine multiple blind detection limits for the UE on a per bandwidth part basis. In this case, each blind detection limit of the multiple determined blind detection limits may correspond to a different bandwidth part of a plurality of bandwidth parts. For example, the base station may determine a first blind detection limit corresponding to a first bandwidth part and may determine a second blind detection limit corresponding to a second bandwidth part. Thereafter, the base station may transmit one or more indications of the multiple blind detection limits on a per bandwidth part basis. For example, the base station may transmit a first indication of the first blind detection limit corresponding to the first bandwidth part and may transmit a second indication of the second blind detection limit corresponding to the second bandwidth part. In some cases, the base station may transmit the indications of the at least one blind detection limit (e.g., the first indication corresponding to the first bandwidth part and the second indication corresponding to the second bandwidth part) to the UE dynamically (e.g., the base station may periodically transmit such indications at will at various times).

In some cases, the at least one blind detection limit (e.g., of the set of blind detection limits) may apply to at least one of a particular slot of a plurality of slots, a group of consecutive slots, or a group of consecutive symbols.

In some cases, the set of blind detection limits may comprise a secondary set of blind detection limits different from a primary set of blind detection limits defined in a standards document. For example, in some cases, the primary set of blind detection limits may comprise a set of blind detection limits specified in a standards document that may be used by the UE by default if no additional configuration regarding blind detection limits is received from the base station. For example, the UE may, by default, be configured to use a blind detection limit from the primary set of blind detection limits. However, in some cases, as noted above, the UE may receive an indication of the at least one blind detection limit from the base station, configuring the UE to use a blind detection limit from the secondary set of blind detection limits. In some cases, the secondary set of blind detection limits may also be specified in a standards document or may be configured in the UE by radio resource control (RRC) signaling transmitted by the base station.

In some cases, the at least one blind detection limit received from the base station, as well as the secondary set of blind detection limits, may, at times, be activated or deactivated based on signaling from the base station. For example, transmitting the indication of the at least one blind detection limit by the base station may include transmitting at least one of an indication to activate the at least one blind detection limit or an indication to deactivate the at least one blind detection limit. Accordingly, based on the received indication to activate, the UE may begin using the at least one blind detection limit to monitor for the control channel. Further, based on an indication received from the base station to deactivate, the UE may stop using the at least one blind detection limit to monitor for the control channel.

In some cases, the base station may transmit at least one of the indication to activate or the indication to deactivate dynamically via at least one of a UE-specific message, a group-common downlink control information (DCI), or a downlink media access control (MAC) control element (CE).

Additionally, in some cases, the indication to activate and/or indication to deactivate may each be associated with a particular expiration timer. In some cases, an indication of the expiration timer may be included within the indication to activate and/or indication to deactivate. In some cases, the base station may transmit the indication of the expiration timer in RRC signaling or the expiration timer, corresponding to the at least one blind detection limit, may be preconfigured in a standards document.

Accordingly, when the UE receives an indication to activate the at least one blind detection limit, the UE may start the expiration timer and use the at least one blind detection limit to monitor for the control timer until the expiration timer expires. Similarly, when the UE receives an indication to deactivate the at least one blind detection limit, the UE may start the expiration timer and stop using the at least one blind detection limit to monitor for the control channel until the expiration timer expires. Thereafter, the UE may again use the at least one blind detection limit to monitor for the control channel.

Example Wireless Communication Devices

Figure 8:
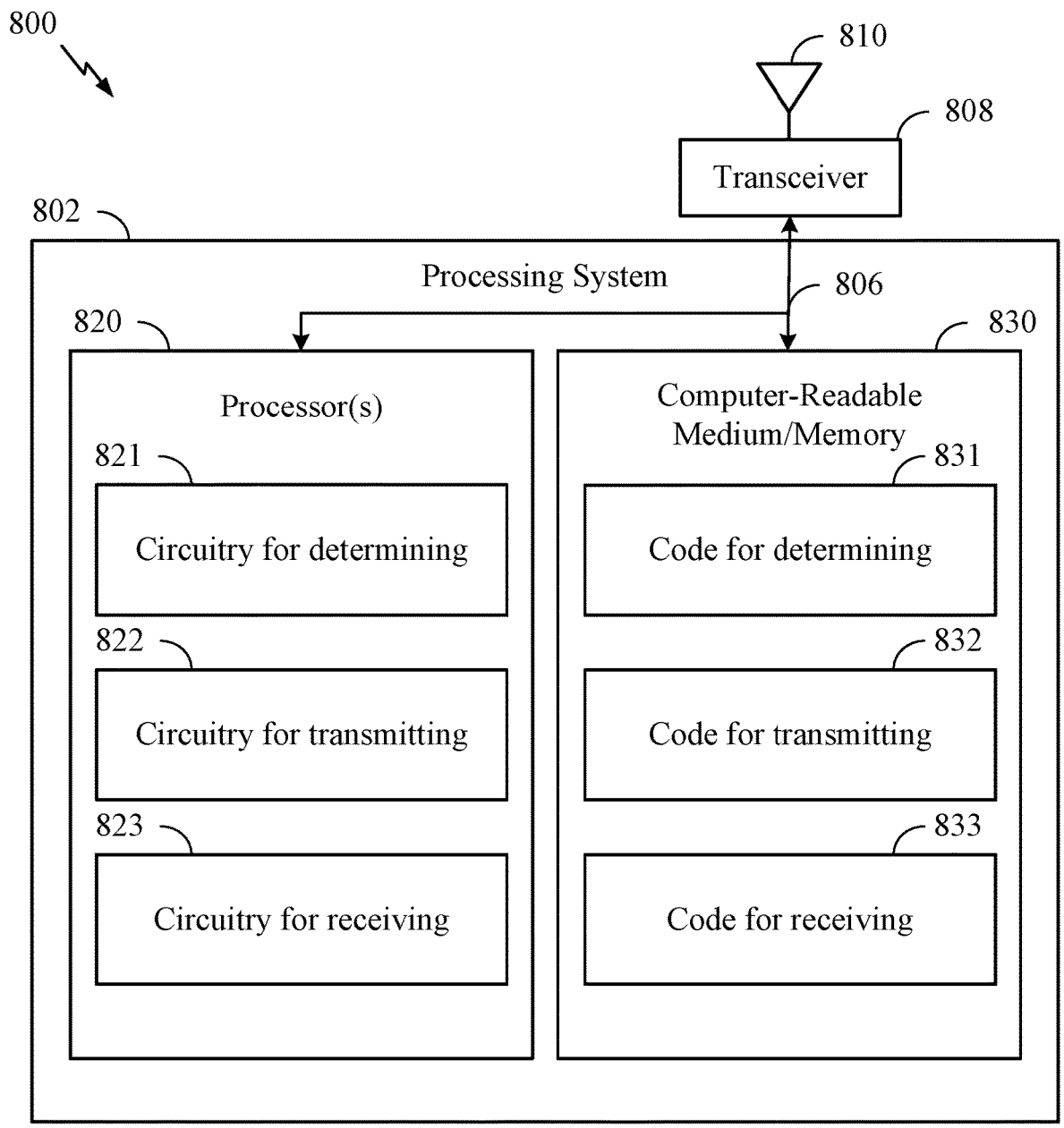
FIG. 8 illustrates a communications device that may include various components configured to perform operations for the techniques disclosed herein in accordance with aspects of the present disclosure.

FIG. 8 depicts an example communications device 800 that includes various components operable, configured, or adapted to perform operations for the techniques disclosed herein, such as the operations depicted and described with respect to FIG. 6. In some examples, communications device 800 may be a base station 110 as described, for example with respect to FIGS. 1 and 2.

Communications device 800 includes a processing system 802 coupled to a transceiver 808 (e.g., a transmitter and/or a receiver). Transceiver 808 is configured to transmit (or send) and receive signals for the communications device 800 via an antenna 810, such as the various signals as described herein. Processing system 802 may be configured to perform processing functions for communications device 800, including processing signals received and/or to be transmitted by communications device 800.

Processing system 802 includes one or more processors 820 coupled to a computer-readable medium/memory 830 via a bus 806. In certain aspects, computer-readable medium/memory 830 is configured to store instructions (e.g., computer-executable code) that when executed by the one or more processors 820, cause the one or more processors 820 to perform the operations illustrated in FIG. 6, or other operations for performing the various techniques discussed herein for communicating using adaptive control channel blind detection limits.

In the depicted example, computer-readable medium/memory 830 stores code 831 for determining, code 832 for transmitting, and code 833 for receiving.

In the depicted example, the one or more processors 820 include circuitry configured to implement the code stored in the computer-readable medium/memory 830, including circuitry 821 for determining, circuitry 822 for transmitting, and circuitry 823 for receiving.

Various components of communications device 800 may provide means for performing the methods described herein, including with respect to FIG. 6.

In some examples, means for transmitting or sending (or means for outputting for transmission) may include the transceivers 232 and/or antenna(s) 234 of the base station 110 illustrated in FIG. 2 and/or transceiver 808 and antenna 810 of the communications device 800 in FIG. 8.

In some examples, means for receiving (or means for obtaining) may include the transceivers 232 and/or antenna(s) 234 of the base station 110 illustrated in FIG. 2 and/or transceiver 808 and antenna 810 of the communications device 800 in FIG. 8.

In some examples, means for determining may include various processing system components, such as: the one or more processors 820 in FIG. 8, or aspects of the base station 110 depicted in FIG. 2, including receive processor 238, transmit processor 220, TX MIMO processor 230, and/or controller/processor 240 (including blind detection module 241).

Notably, FIG. 8 is an example, and many other examples and configurations of communications device 800 are possible.

Figure 9:
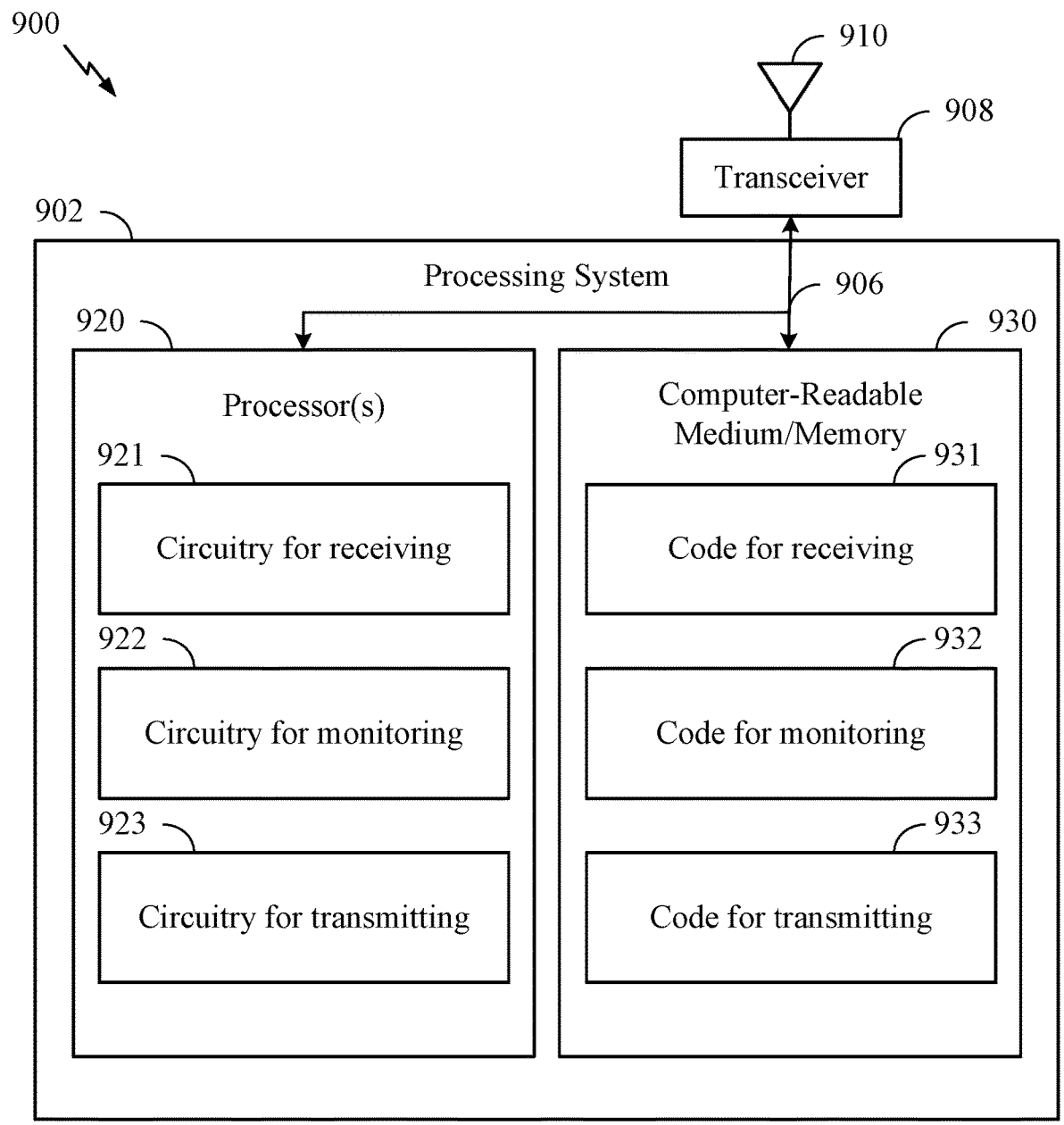
FIG. 9 illustrates a communications device that may include various components configured to perform operations for the techniques disclosed herein in accordance with aspects of the present disclosure.

FIG. 9 depicts an example communications device 900 that includes various components operable, configured, or adapted to perform operations for the techniques disclosed herein, such as the operations depicted and described with respect to FIG. 7. In some examples, communications device 900 may be a user equipment 120 as described, for example with respect to FIGS. 1 and 2.

Communications device 900 includes a processing system 902 coupled to a transceiver 908 (e.g., a transmitter and/or a receiver). Transceiver 908 is configured to transmit (or send) and receive signals for the communications device 900 via an antenna 910, such as the various signals as described herein. Processing system 902 may be configured to perform processing functions for communications device 900, including processing signals received and/or to be transmitted by communications device 900.

Processing system 902 includes one or more processors 920 coupled to a computer-readable medium/memory 930 via a bus 906. In certain aspects, computer-readable medium/memory 930 is configured to store instructions (e.g., computer-executable code) that when executed by the one or more processors 920, cause the one or more processors 920 to perform the operations illustrated in FIG. 7, or other operations for performing the various techniques discussed herein for communicating using adaptive control channel blind detection limits.

In the depicted example, computer-readable medium/memory 930 stores code 931 for receiving, code 932 for monitoring, and code 933 for transmitting.

In the depicted example, the one or more processors 920 include circuitry configured to implement the code stored in the computer-readable medium/memory 930, including circuitry 921 for receiving, circuitry 922 for monitoring, and circuitry 923 for transmitting.

Various components of communications device 900 may provide means for performing the methods described herein, including with respect to FIG. 7.

In some examples, means for transmitting or sending (or means for outputting for transmission) may include the transceivers 254 and/or antenna(s) 252 of the user equipment 120 illustrated in FIG. 2 and/or transceiver 908 and antenna 910 of the communications device 900 in FIG. 9.

In some examples, means for receiving (or means for obtaining) may include the transceivers 254 and/or antenna(s) 252 of the user equipment 120 illustrated in FIG. 2 and/or transceiver 908 and antenna 910 of the communications device 900 in FIG. 9.

In some examples, means for performing may include various processing system components, such as: the one or more processors 920 in FIG. 9, or aspects of the user equipment 104 depicted in FIG. 2, including receive processor 258, transmit processor 264, TX MIMO processor 266, and/or controller/processor 280 (including blind detection module 281).

Notably, FIG. 9 is an example, and many other examples and configurations of communications device 900 are possible.

Example Clauses

Implementation examples are described in the following numbered clauses:

Clause 1: A method for wireless communication performed by a base station (BS), comprising: determining at least one blind detection limit for detecting a control channel from a set of blind detection limits; and transmitting an indication of the at least one blind detection limit to a user equipment (UE).

Clause 2: The method of Clause 1, wherein the at least one blind detection limit includes at least one of: a limit on a number of blind decodes that may be performed to detect the control channel; or a limit on a number of control channel elements corresponding to a decoding candidate of the control channel.

Clause 3: The method of any of Clauses 1-2, wherein the determining the at least one blind detection limit is based, at least in part, on a power level of the UE.

Clause 4: The method of Clause 3, further comprising receiving an indication of the power level from the UE.

Clause 5: The method of any of Clauses 1-4, wherein the determining the at least one blind detection limit is based, at least in part, on at least one of: a subcarrier spacing associated with the control channel; a frequency range associated with the control channel; or a capability of the UE.

Clause 6: The method of any of Clauses 1-2, further comprising receiving signaling from the UE requesting to use the at least one blind detection limit, wherein the determining the at least one blind detection limit is based on the signaling received from the UE.

Clause 7: The method of Clause 6, wherein the signaling comprises an explicit indication of the at least one blind detection limit.

Clause 8: The method of Clause 7, wherein the explicit indication includes an index value corresponding to the at least one blind detection limit.

Clause 9: The method of Clause 8, wherein determining the at least one blind detection limit comprises using the index value to determine the at least one blind detection limit in a lookup table.

Clause 10: The method of Clause 6, wherein the signaling comprises an implicit indication of the at least one blind detection limit.

Clause 11: The method of Clause 10, wherein the implicit indication comprises at least one of: an indication of a capability of the UE; or a power level of the UE.

Clause 12: The method of any of Clauses 6-11, wherein the signaling comprises at least one of: uplink control information (UCI); or a media access control (MAC) control element (CE).

Clause 13: The method of any of Clauses 1-5, wherein determining the at least one blind detection limit comprises determining multiple blind detection limits, wherein each blind detection limit of the multiple determined blind detection limits corresponds to a different bandwidth part of a plurality of bandwidth parts.

Clause 14: The method of claim 13, wherein transmitting the indication of the at least one blind detection limit to the UE comprises dynamically transmitting one or more indications of the multiple blind detection limits on a per bandwidth part basis.

Clause 15: The method of claim 14, wherein dynamically transmitting one or more indications of the multiple blind detection limits on a per bandwidth part basis comprises: transmitting a first indication of a first blind detection limit corresponding to a first bandwidth part; and transmitting a second indication of a second blind detection limit corresponding to a second bandwidth part.

Clause 16: The method of any of Clauses 1-15, wherein the set of blind detection limits apply to one of: a particular slot of a plurality of slots; a group of consecutive slots; or a group of consecutive symbols.

Clause 17: The method of any of Clauses 1-16, further comprising transmitting at least one of: an indication to activate the at least one blind detection limit; or an indication to deactivate the at least one blind detection limit.

Clause 18: The method of Clause 17, wherein at least one of the indication to activate or the indication to deactivate is transmitted dynamically via at least one of: a UE-specific message; group-common downlink control information (DCI); or a downlink media access control (MAC) control element (CE).

Clause 19: The method of any of Clauses 17-18, wherein at least one of the indication to activate or the indication to deactivate is associated with an expiration timer.

Clause 20: The method of Clause 19, wherein at least one of the indication to activate or the indication to deactivate comprises an indication of the expiration timer.

Clause 21: The method of any of Clauses 19-20, further comprising transmitting an indication of the expiration timer in radio resource control (RRC) signaling.

Clause 22: The method of any of Clauses 19-21, wherein the expiration timer is preconfigured in a standards document.

Clause 23: The method of any of Clauses 1-22, wherein the set of blind detection limits comprises a secondary set of blind detection limits different from a primary set of blind detection limits defined in a standards document.

Clause 24: The method of Clause 23, wherein the secondary set of blind detection limits are one of: defined in the standards document; or transmitted by the base station to the UE in radio resource control (RRC) signaling.

Clause 25: The method of any of Clauses 1-24, wherein: the indication of the at least one blind detection limit is transmitted to the UE dynamically; or the indication of the at least one blind detection limit is transmitted in semi-persistent scheduling information, scheduling the UE to use the at least one blind detection limit for a period of time.

Clause 26: A method for wireless communication by a user equipment, comprising: receiving, from a base station, an indication of at least one blind detection limit for detecting a control channel from a set of blind detection limits; and monitoring for the control channel based on the received indication of the at least one blind detection limit for detecting the control channel.

Clause 27: The method of Clause 26, wherein the at least one blind detection limit includes at least one of: a limit on a number of blind decodes that may be performed to detect the control channel; or a limit on a number of control channel elements corresponding to a decoding candidate of the control channel.

Clause 28: The method of any of Clauses 26-27, wherein the at least one blind detection limit is based, at least in part, on a power level of the UE.

Clause 29: The method of Clause 28, further comprising transmitting an indication of the power level to the base station.

Clause 30: The method of any of Clauses 26-29, wherein the at least one blind detection limit is further based, at least in part, on at least one of: a subcarrier spacing associated with the control channel; a frequency range associated with the control channel; or a capability of the UE.

Clause 31: The method of any of Clauses 26-30, further comprising transmitting signaling to the base station requesting to use the at least one blind detection limit.

Clause 32: The method of Clause 31, wherein the signaling comprises an explicit indication of the at least one blind detection limit.

Clause 33: The method of Clause 32, wherein the explicit indication includes an index value corresponding to the at least one blind detection limit.

Clause 34: The method of Clause 31, wherein the signaling comprises an implicit indication of the at least one blind detection limit.

Clause 35: The method of claim 34, wherein the implicit indication comprises at least one of: an indication of a capability of the UE; or a power level of the UE.

Clause 36: The method of any of Clauses 31-25, wherein the signaling comprises at least one of: uplink control information (UCI); or a media access control (MAC) control element (CE).

Clause 37: The method of any of Clauses 26-36, wherein the at least one blind detection limit comprises multiple blind detection limits, wherein each blind detection limit of the multiple blind detection limits corresponds to a different bandwidth part of a plurality of bandwidth parts.

Clause 38: The method of Clause 37, wherein receiving the indication of the at least one blind detection limit comprises dynamically receiving one or more indications of the multiple blind detection limits on a per bandwidth part basis.

Clause 39: The method of Clause 38, wherein dynamically receiving one or more indications of the multiple blind detection limits on a per bandwidth part basis comprises: receiving a first indication of a first blind detection limit corresponding to a first bandwidth part; and receiving a second indication of a second blind detection limit corresponding to a second bandwidth part.

Clause 40: The method of any of Clauses 26-39, wherein the set of blind detection limits apply to one of: a particular slot of a plurality of slots; a group of consecutive slots; or a group of consecutive symbols.

Clause 41: The method of any of Clauses 26-40, further comprising receiving at least one of: an indication to activate the at least one blind detection limit; or an indication to deactivate the at least one blind detection limit.

Clause 42: The method of Clause 41, wherein at least one of the indication to activate or the indication to deactivate is received dynamically via at least one of: a UE-specific message; group-common downlink control information (DCI); or a downlink media access control (MAC) control element (CE).

Clause 43: The method of any of Clauses 41-42, wherein at least one of the indication to activate or the indication to deactivate is associated with an expiration timer.

Clause 44: The method of Clause 43, wherein at least one of the indication to activate or the indication to deactivate comprises an indication of the expiration timer.

Clause 45: The method of any of Clauses 43-44, further comprising receiving an indication of the expiration timer in radio resource control (RRC) signaling.

Clause 46: The method of any of Clauses 43-45, wherein the expiration timer is preconfigured in a standards document.

Clause 47: The method of any of Clauses 26-46, wherein the set of blind detection limits comprises a secondary set of blind detection limits different from a primary set of blind detection limits defined in a standards document.

Clause 48: The method of Clause 47, wherein the secondary set of blind detection limits are one of: defined in the standards document; or received from the base station in radio resource control (RRC) signaling.

Clause 49: The method of any of Clauses 26-48, wherein: the indication of the at least one blind detection limit is received from the base station dynamically; or the indication of the at least one blind detection limit is received in semi-persistent scheduling information, scheduling the UE to use the at least one blind detection limit for a period of time.

Clause 50: An apparatus, comprising: a memory comprising executable instructions; one or more processors configured to execute the executable instructions and cause the apparatus to perform a method in accordance with any of Clauses 1-49.

Clause 51: An apparatus, comprising means for performing a method in accordance with any of Clauses 1-49.

Clause 52: A non-transitory computer-readable medium comprising executable instructions that, when executed by one or more processors of an apparatus, cause the apparatus to perform a method in accordance with any of Clauses 1-49.

Clause 53: A computer program product embodied on a computer-readable storage medium comprising code for performing a method in accordance with any of Clauses 1-49.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 6-7, as well as other operations described herein for communicating using adaptive control channel blind detection limits.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication performed by a base station (BS), comprising:
   determining at least one blind detection limit for detecting a control channel from a set of blind detection limits; and
   transmitting an indication of the at least one blind detection limit to a user equipment (UE), and wherein:
      the method further comprises receiving signaling from the UE requesting to use the at least one blind detection limit, wherein the determining the at least one blind detection limit is based on the signaling received from the UE, wherein the signaling comprises at least one of uplink control information (UCI) or a media access control (MAC) control element (CE); or
      the method further comprises transmitting at least one of an indication to activate the at least one blind detection limit or an indication to deactivate the at least one blind detection limit; or
      the set of blind detection limits comprises a secondary set of blind detection limits different from a primary set of blind detection limits defined in a standards document, and the secondary set of blind detection limits are one of defined in the standards document or transmitted by the BS to the UE in radio resource control (RRC) signaling.

2. The method of claim 1, wherein the method comprises the receiving signaling from the UE requesting to use the at least one blind detection limit, wherein the determining the at least one blind detection limit is based on the signaling received from the UE, wherein the signaling comprises at least one of uplink control information (UCI) or a media access control (MAC) control element (CE).

3. The method of claim 2, wherein:
   the signaling comprises an explicit indication of the at least one blind detection limit, the explicit indication includes an index value corresponding to the at least one blind detection limit, and the method further comprises determining the at least one blind detection limit comprises using the index value to determine the at least one blind detection limit in a lookup table; or
   the signaling comprises an implicit indication of the at least one blind detection limit, and the implicit indication comprises at least one of an indication of a capability of the UE, or a power level of the UE.

4. The method of claim 1, wherein the method comprises the transmitting at least one of an indication to activate the at least one blind detection limit or an indication to deactivate the at least one blind detection limit.

5. The method of claim 4, wherein at least one of the indication to activate or the indication to deactivate is transmitted dynamically via at least one of:
   a UE-specific message;
   group-common downlink control information (DCI); or
   a downlink media access control (MAC) control element (CE).

6. The method of claim 4, wherein:
at least one of the indication to activate or the indication to deactivate is associated with an expiration timer, and
at least one of the indication to activate or the indication to deactivate comprises an indication of the expiration timer,
and one of:
the method further comprises transmitting the indication of the expiration timer in radio resource control (RRC) signaling, or
the expiration timer is preconfigured in a standards document.

7. The method of claim 1, wherein:
the set of blind detection limits comprises a secondary set of blind detection limits different from a primary set of blind detection limits defined in a standards document, and the secondary set of blind detection limits are one of: defined in the standards document or transmitted by the BS to the UE in radio resource control (RRC) signaling.

8. A method for wireless communication by a user equipment (UE), comprising:
receiving, from a base station (BS), an indication of at least one blind detection limit for detecting a control channel from a set of blind detection limits; and
monitoring for the control channel based on the received indication of the at least one blind detection limit for detecting the control channel,
wherein:
the method further comprises transmitting signaling to the BS requesting to use one or more blind detection limit, wherein the signaling comprises at least one of uplink control information (UCI) or a media access control (MAC) control element (CE); or
the method further comprises receiving at least one of an indication to activate the at least one blind detection limit or an indication to deactivate the at least one blind detection limit; or
the set of blind detection limits comprises a secondary set of blind detection limits different from a primary set of blind detection limits defined in a standards document, and the secondary set of blind detection limits are one of defined in the standards document or received from the BS in radio resource control (RRC) signaling.

9. The method of claim 8, wherein the method comprises the transmitting signaling to the BS requesting to use one or more blind detection limit, wherein the signaling comprises at least one of uplink control information (UCI) or a media access control (MAC) control element (CE).

10. The method of claim 9, wherein:
the signaling comprises an explicit indication of the at least one blind detection limit,
the explicit indication includes an index value corresponding to the at least one blind detection limit.

11. The method of claim 9, wherein:
the signaling comprises an implicit indication of the at least one blind detection limit, and
the implicit indication comprises at least one of:
an indication of a capability of the UE; or
a power level of the UE.

12. The method of claim 8, wherein the method comprises the receiving at least one of an indication to activate the at least one blind detection limit or an indication to deactivate the at least one blind detection limit.

13. The method of claim 12, wherein at least one of the indication to activate or the indication to deactivate is received dynamically via at least one of:
a UE-specific message;
group-common downlink control information (DCI); or
a downlink media access control (MAC) control element (CE).

14. The method of claim 12, wherein:
at least one of the indication to activate or the indication to deactivate is associated with an expiration timer,
at least one of the indication to activate or the indication to deactivate comprises an indication of the expiration timer, and
one of:
the method further comprises receiving the indication of the expiration timer in radio resource control (RRC) signaling, or
the expiration timer is preconfigured in a standards document.

15. The method of claim 8, wherein:
the set of blind detection limits comprises a secondary set of blind detection limits different from a primary set of blind detection limits defined in a standards document, and the secondary set of blind detection limits are one of defined in the standards document or received from the BS in radio resource control (RRC) signaling.

16. An apparatus for wireless communication performed by a user equipment (UE), comprising a memory comprising executable instructions, and further comprising one or more processors configured to execute the executable instructions and cause the apparatus to:
receive, from a base station (BS), an indication of at least one blind detection limit for detecting a control channel from a set of blind detection limits; and
monitor for the control channel based on the received indication of the at least one blind detection limit for detecting the control channel,
wherein:
the one or more processors are configured to execute the executable instructions and cause the apparatus to transmit signaling to the BS requesting to use one or more blind detection limit, wherein the signaling comprises at least one of uplink control information (UCI) or a media access control (MAC) control element (CE); or
the one or more processors are configured to execute the executable instructions and cause the apparatus to receive at least one of an indication to activate the at least one blind detection limit or an indication to deactivate the at least one blind detection limit; or
the set of blind detection limits comprises a secondary set of blind detection limits different from a primary set of blind detection limits defined in a standards document, and the secondary set of blind detection limits are defined in the standards document or the one or more processors are configured to execute the executable instructions and cause the apparatus to receive the secondary set of blind detection limits from the BS in radio resource control (RRC) signaling.

17. The apparatus of claim 16, wherein:
the one or more processors are configured to execute the executable instructions and cause the apparatus to transmit signaling to the BS requesting to use one or more blind detection limit, wherein the signaling comprises at least one of uplink control information (UCI) or a media access control (MAC) control element (CE).

18. The apparatus of claim 17, wherein:
the signaling comprises an explicit indication of the at least one blind detection limit,
the explicit indication includes an index value corresponding to the at least one blind detection limit.

19. The apparatus of claim 17, wherein:
the signaling comprises an implicit indication of the at least one blind detection limit, and
the implicit indication comprises at least one of:
an indication of a capability of the UE; or
a power level of the UE.

20. The apparatus of claim 16, wherein:
the one or more processors are configured to execute the executable instructions and cause the apparatus to receive at least one of an indication to activate the at least one blind detection limit or an indication to deactivate the at least one blind detection limit.

21. The apparatus of claim 20, wherein the one or more processors are configured to execute the executable instructions and cause the apparatus to receive at least one of the indication to activate or the indication to deactivate dynamically via at least one of:
a UE-specific message;
group-common downlink control information (DCI); or
a downlink media access control (MAC) control element (CE).

22. The apparatus of claim 20, wherein:
at least one of the indication to activate or the indication to deactivate is associated with an expiration timer,
at least one of the indication to activate or the indication to deactivate comprises an indication of the expiration timer, and
one of:
the one or more processors are configured to execute the executable instructions and cause the apparatus to receive the indication of the expiration timer in radio resource control (RRC) signaling, or
the expiration timer is preconfigured in a standards document.

23. The apparatus of claim 16, wherein:
the set of blind detection limits comprises a secondary set of blind detection limits different from a primary set of blind detection limits defined in a standards document, and the secondary set of blind detection limits are defined in the standards document or the one or more processors are configured to execute the executable instructions and cause the apparatus to receive the secondary set of blind detection limits from the BS in radio resource control (RRC) signaling.

24. An apparatus for wireless communication performed by a base station (BS), comprising a memory comprising executable instructions, and further comprising one or more processors configured to execute the executable instructions and cause the apparatus to:
determine at least one blind detection limit for detecting a control channel from a set of blind detection limits; and
transmit an indication of the at least one blind detection limit to a user equipment (UE), and wherein:
the one or more processors are configured to execute the executable instructions and cause the apparatus to receive signaling from the UE requesting to use the at least one blind detection limit and to determine the at least one blind detection limit based on the signaling received from the UE, wherein the signaling comprises at least one of uplink control information (UCI) or a media access control (MAC) control element (CE); or
the one or more processors are configured to execute the executable instructions and cause the apparatus to transmit at least one of an indication to activate the at least one blind detection limit or an indication to deactivate the at least one blind detection limit; or
the set of blind detection limits comprises a secondary set of blind detection limits different from a primary set of blind detection limits defined in a standards document, and the secondary set of blind detection limits are defined in the standards document or the one or more processors are configured to execute the executable instructions and cause the apparatus to transmit the secondary set of blind detection limits to the UE in radio resource control (RRC) signaling.

25. The apparatus of claim 24, wherein:
the one or more processors are configured to execute the executable instructions and cause the apparatus to receive signaling from the UE requesting to use the at least one blind detection limit and to determine the at least one blind detection limit based on the signaling received from the UE, wherein the signaling comprises at least one of uplink control information (UCI) or a media access control (MAC) control element (CE).

26. The apparatus of claim 25, wherein:
the signaling comprises an explicit indication of the at least one blind detection limit, the explicit indication includes an index value corresponding to the at least one blind detection limit, and the one or more processors are configured to execute the executable instructions and cause the apparatus to use the index value to determine the at least one blind detection limit in a lookup table; or
the signaling comprises an implicit indication of the at least one blind detection limit, and the implicit indication comprises at least one of an indication of a capability of the UE or a power level of the UE.

27. The apparatus of claim 24, wherein:
the one or more processors are configured to execute the executable instructions and cause the apparatus to transmit at least one of an indication to activate the at least one blind detection limit or an indication to deactivate the at least one blind detection limit.

28. The apparatus of claim 27, wherein the one or more processors are configured to execute the executable instructions and cause the apparatus to transmit at least one of the indication to activate or the indication to deactivate dynamically via at least one of:
a UE-specific message;
group-common downlink control information (DCI); or
a downlink media access control (MAC) control element (CE).

29. The apparatus of claim 27, wherein:
at least one of the indication to activate or the indication to deactivate is associated with an expiration timer, and
at least one of the indication to activate or the indication to deactivate comprises an indication of the expiration timer,
and one of:
the one or more processors are configured to execute the executable instructions and cause the apparatus to transmit the indication of the expiration timer in radio resource control (RRC) signaling, or
the expiration timer is preconfigured in a standards document.

30. The apparatus of claim 24, wherein:
the set of blind detection limits comprises a secondary set of blind detection limits different from a primary set of blind detection limits defined in a standards document, and the secondary set of blind detection limits are defined in the standards document or the one or more processors are configured to execute the executable instructions and cause the apparatus to transmit the secondary set of blind detection limits to the UE in radio resource control (RRC) signaling.

* * * * *